May 12, 1942.   D. D. DEMAREST ET AL   2,282,945
INTERMITTENT FEEDING DEVICE
Filed Aug. 1, 1940
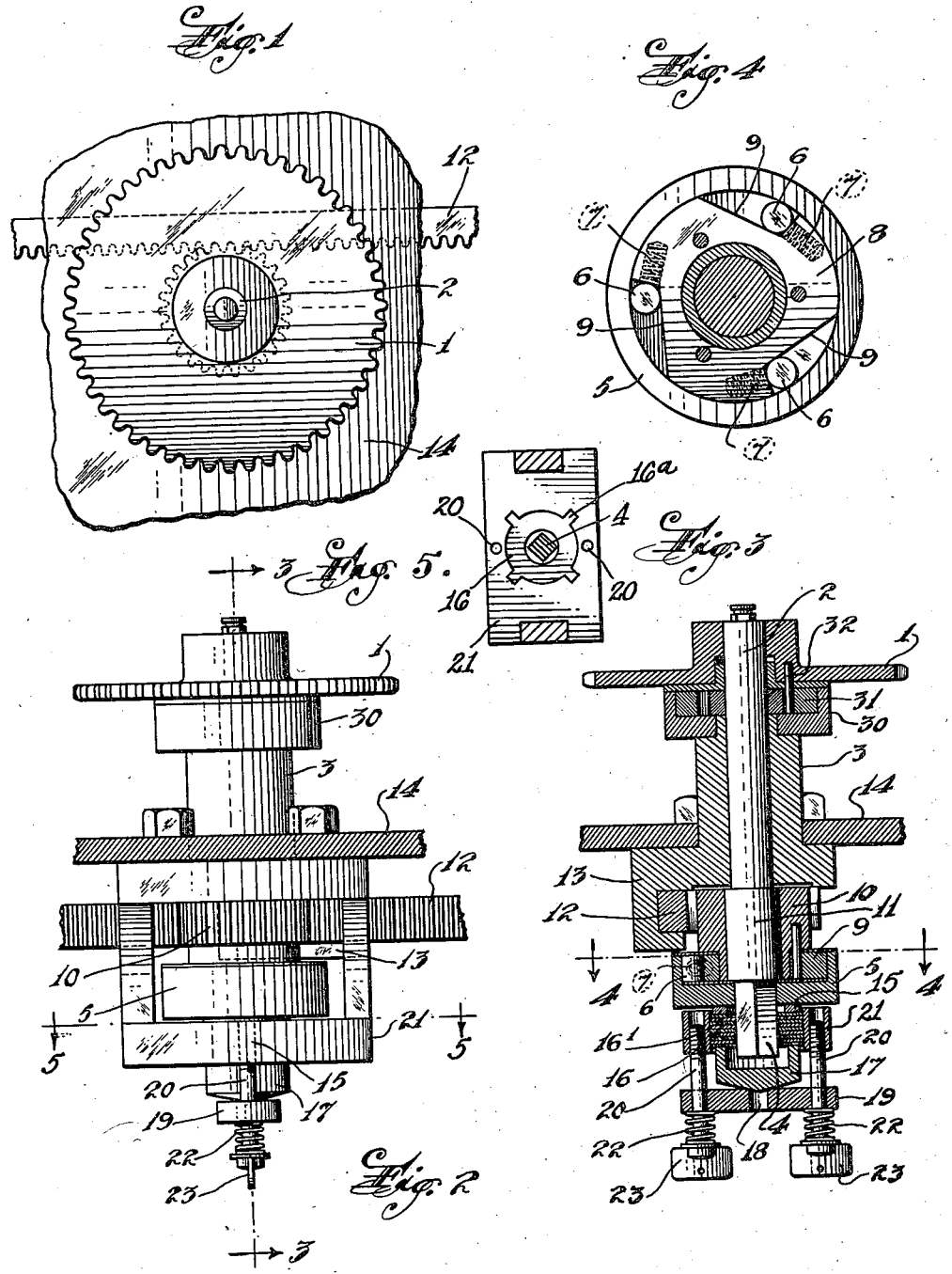
INVENTORS
DANIEL DOUGLAS DEMAREST
CARL BERENDT
WILLIAM KARIUS
BY Fred'k C. Fischer, Atty.

Patented May 12, 1942

2,282,945

UNITED STATES PATENT OFFICE 2,282,945

INTERMITTENT FEEDING DEVICE

Daniel Douglas Demarest, Little Neck, N. Y., and Carl Berendt, East Orange, and William Karius, Irvington, N. J., assignors to Automatic Linker, Inc., Newark, N. J., a corporation of New York Application August 1, 1940, Serial No. 349,214

3 Claims. (Cl. 74—130)

This invention relates to improvements in intermittent feeding devices for automatic sausage linking machines such as described in U. S. Patent No. 2,228,075, issued on January 7, 1941.

In automatic sausage linking machines, the sausage casings are intermittently moved in one direction through the machine, and due to the peculiar nature of sausage in casings, ease and positiveness of the feeding device is of great importance. Should the feeder offer too much resistance or move too freely, there will be a tendency of the sausages to bunch and stop the operation of the machine.

It is therefore an object of this invention to provide a structure for a feeding device in a sausage linking machine, which can be conveniently adjusted to provide proper feeding of sausage casings through the machine to prevent bunching or other disarrangement of the sausage casings which may interfere with the efficient operation of the machine.

A further object of the invention is the provision of a relatively simple structure for intermittently operating a feeding device for a sausage linking machine, and for adjusting the operation of such devices.

These and other advantageous objects, which will later appear, are accomplished by the simple and practical construction and arrangement of parts hereinafter described and exhibited in the accompanying drawing, forming part hereof, and in which:

Fig. 1 is a plan view of a feeding device for a sausage linking machine,

Fig. 2 is an elevational view of the feeding device,

Fig. 3 is a sectional view taken on line 3—3 of Fig. 2,

Fig. 4 is an enlarged sectional view taken on line 4—4 of Fig. 3 and

Fig. 5 is a sectional view taken on line 5—5 of Fig. 2, looking in the direction of the arrows.

Referring to the drawing, the feeder for a sausage linking machine comprises a sprocket wheel 1 over which normally passes a chain (not shown). Sprocket wheel 1 is connected to a shaft 2 (as hereinafter described) which is journalled in a bearing 3 and has the lower end 4 thereof arranged to rotate with a cup member 5, which is one element of a one-way clutch. Positioned in the cup member 5 are a plurality of small rollers 6 which are normally pressed against the inner wall of cup member 5 by compression springs 7 positioned in recesses in a plate member 8 which is positioned in the member 5 and has portions 9 cut away at an angle so that when the member 8 is moved in one direction in cup member 5, the roller 6 will be wedged in between the cut-away portion 9 and the inner wall of cup member 5 to cause the latter to rotate with the plate member 8. Plate member 8 is fixed to a pinion 10 which is rotatably mounted on an enlarged portion 11 of the shaft 2, and engages a reciprocating rack 12 which is supported in a bracket 13 forming a part of bearing 3 and positioned below the top member 14 of the sausage linking machine.

The cup member 5 rests upon a ring 15 which is supported by stationary plates 16 and rotary plates 16' of a brake of the bicycle type, the plates being supported by a member 17 having a conical shaped lower surface which is positioned in a recess 18 in a plate 19 through which pass bolts 20 threaded into bar 21 of the supporting structure. The bar 21 is provided with a plurality of recesses which receive projections 16a on stationary plates 16 to prevent rotation thereof (see Fig. 5). Below the plate 19, the bolts 20 are encircled by compression springs 22 which engage the plate 19 and heads 23 at the lower ends of the bolts 20. By adjusting the bolts, the pressure of the brake 16 upon the cup member 5 can be adjusted and thereby control the operation of the feeder.

Fixed to the upper end of bearing 3 is a cup member 30, forming one member of a one-way clutch. Positioned in member 30 is a plate 31, having cut-away portions and rollers similar to portions 9 and spring actuated rollers 6. The plate 31 is connected to sprocket wheel 1 by pins 32. The object of this second clutch is to prevent opposite rotation of the wheel 1 should an unusual amount of friction develop on the lower clutch to cause the latter to rotate in both directions.

In operation, the rack 12 is continually reciprocated by means of structure shown and described in the above mentioned application for United States Letters Patent. When the rack 12 is moved in one direction, the pinion 10 rotates freely about portion 11 of shaft 2 and there is no movement of the cup member 5. When the rack moves in the opposite direction, the rollers 6 will be wedged in between the cut away portion 9 of plate 8 and the inner wall of cup member 5, to cause cup member 5 to rotate with plate 8 and pinion 10. Rotation of cup member 5, which is attached to shaft 4, will also rotate the sprocket wheel 1. Should resistance to rotation of cup member 5 be desired, pressure of the brake plate 16 upon cup member 5 is increased by tightening on the bolts 20; and likewise when easier operation of the cup member 5 is desired, the bolts are unscrewed from the cross bar 21.

From the above description it will be seen that there has been provided a simple and effective structure for feeding sausage casing in automatic sausage linking machines. The feeding device is capable of being adjusted to regulate the ease of operation, such adjustments being made conveniently without requiring dismantling of any part of the machine.

The foregoing disclosure is to be regarded as descriptive and illustrative only, and not as restrictive or limitative of the invention, of which, obviously, embodiments may be considered, including many modifications, without departing from the spirit and scope of the invention herein set forth and denoted in the appended claims.

Having thus described the invention, what is claimed as new and desired to be secured by Letters Patent is:

1. In a feeding device for automatic sausage linking machines, a wheel, a shaft to which the wheel is adapted to be connected, a cup member mounted for rotation with the shaft, a pinion rotatably mounted on the shaft, a rack engaging the pinion, a one-way clutch connection between said pinion and cup member to cause the cup member to rotate in one direction only, a braking device bearing against the cup member to resiliently resist rotation thereof, and a second one-way clutch device for providing the connection between the shaft and wheel and to limit the wheel to rotation in one direction only.

2. In an intermittent feeding device for automatic sausage linking machines, a shaft, a wheel adapted to be connected to the shaft, a cup mounted for rotation with the shaft, an oscillatable member positioned in the cup, means for providing a one-way clutch connection between said member and the cup to cause the cup to rotate in one direction only, means to oscillate said member, a braking device bearing against the cup to resist rotation thereof, and a one-way clutch device for providing the connection between the shaft and wheel and to limit the wheel to rotation in one direction only.

3. In an intermittent feeding device for automatic sausage feeding machines, a shaft, a wheel adapted to be connected to the shaft, an oscillatable member, means to oscillate said member, a one-way clutch device for connecting said oscillatable member to the shaft, a braking device engaging the one-way clutch device to resist rotation thereof, and a second one-way clutch device for providing the connection between the shaft and wheel and to limit the wheel to rotation in one direction only.

DANIEL DOUGLAS DEMAREST.
CARL BERENDT.
WILLIAM KARIUS.